April 19, 1960  J. G. BENTLEY  2,933,112
CHAIN SAW WITH TENSIONING MEANS
Filed July 11, 1957  3 Sheets-Sheet 2
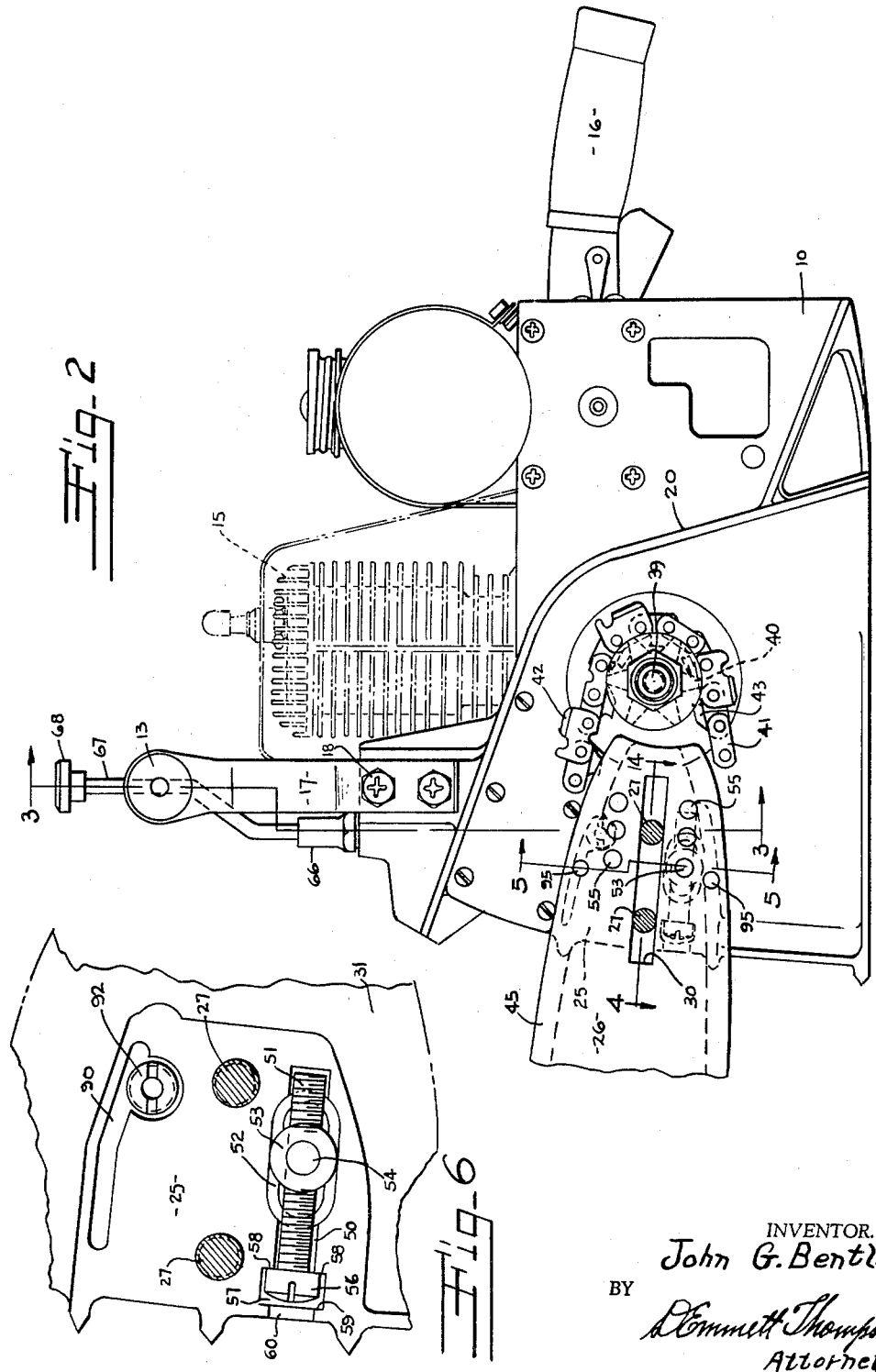
INVENTOR.
John G. Bentley
BY
D. Emmett Thompson
Attorney.

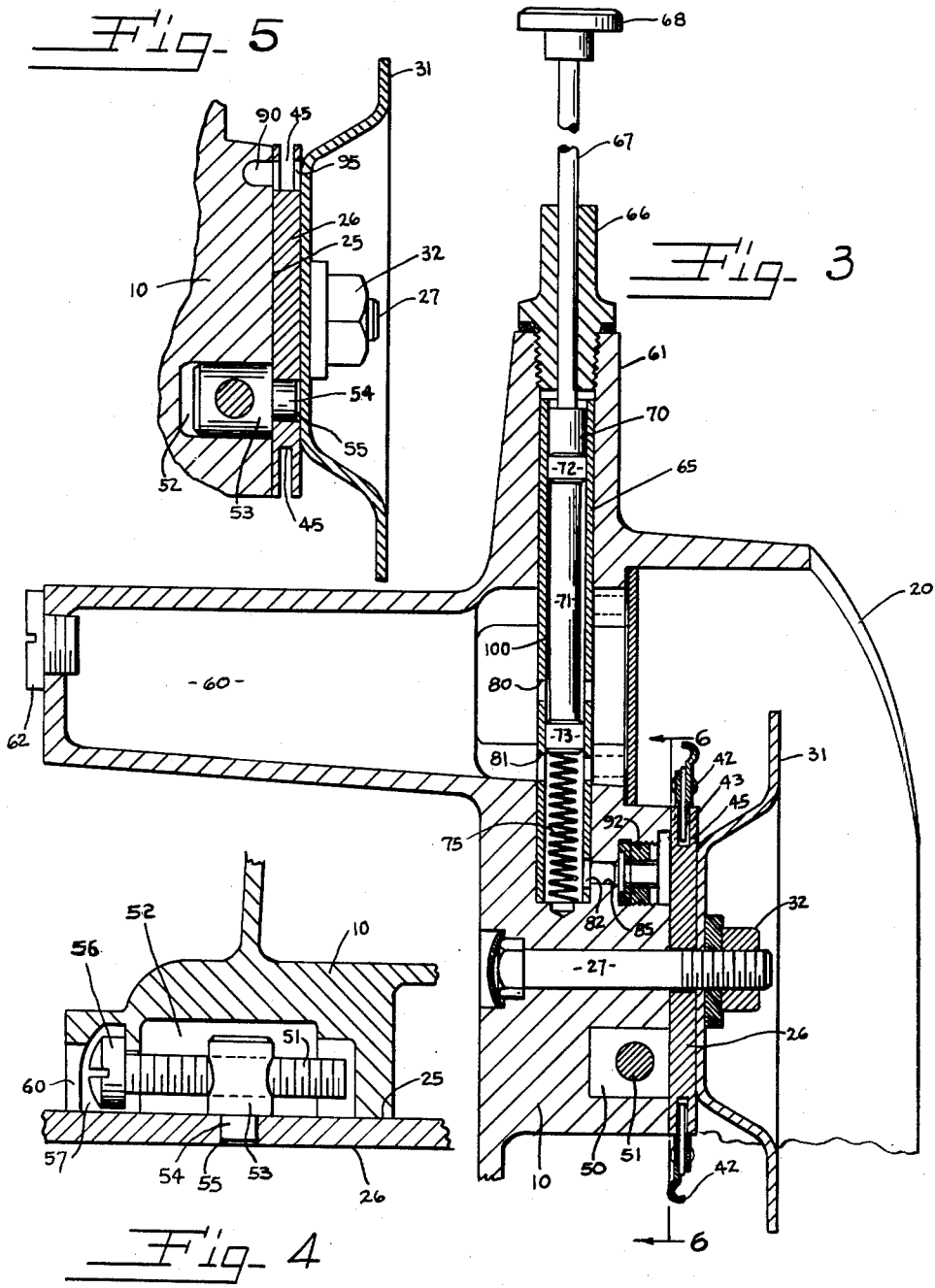

United States Patent Office 2,933,112
Patented Apr. 19, 1960

2,933,112

CHAIN SAW WITH TENSIONING MEANS

John G. Bentley, Liverpool, N.Y., assignor to Porter Cable Machine Company, Syracuse, N.Y., a corporation of New York Application July 11, 1957, Serial No. 671,182

2 Claims. (Cl. 143—32)

The invention relates to portable, power driven saws of the type known as "chain saws."

In such saws a chain having cutting teeth is mounted in a saw guide blade on the saw by means of a tongue and groove type connection, the groove being formed about the periphery of the guide blade and the tongue being carried by the chain.

In the use of such saws there is a great deal of friction between the guide blade and the chain.

It is an object of this invention to provide such a chain saw with a self-contained lubricating structure conveniently operable to provide lubrication to the groove in the saw guide blade.

Further, it is an object of this invention to provide a construction whereby the saw guide blade may be conveniently moved, relative to the housing on which it is mounted, in order to adjust the tension in the saw chain.

The invention consists in the novel features and in the combinations and constructions hereinafter set forth and claimed.

In describing this invention, reference is had to the accompanying drawings in which like characters designate corresponding parts in all the views.

Figure 2 is a view looking to the right, Figure 1 with parts omitted for the sake of clarity.

Figure 3 is a cross section taken on line 3—3, of Figure 2.

Figure 4 is a fragmentary section taken on line 4—4, of Figure 2.

Figure 5 is a cross section taken on line 5—5, of Figure 2.

Figure 6 is a view taken on line 6—6, of Figure 3.

Figure 1:
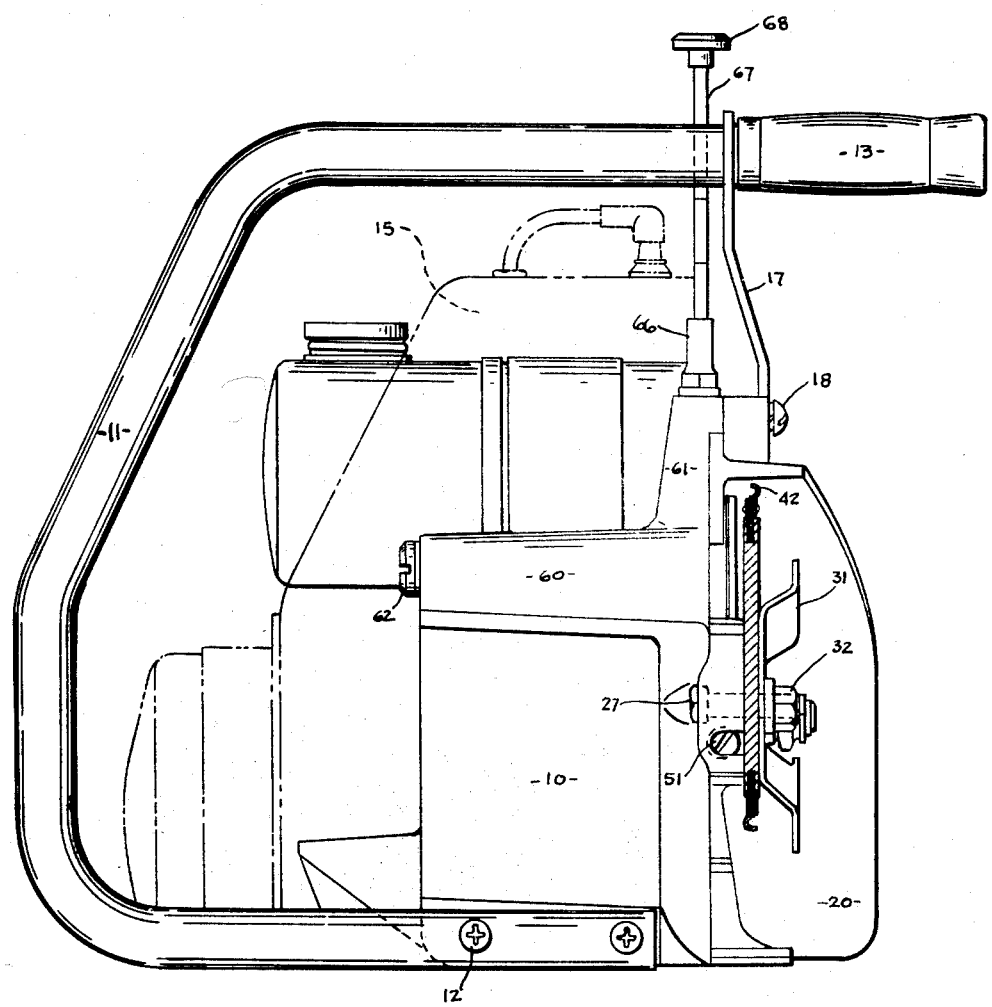
Figure 1 is a front elevational view of the chain saw embodying my invention, the guide blade and chain being shown in section.

Referring to Figure 1 it will be seen that the chain saw is made up of a housing 10 to which a U shaped handle is fixed as by fasteners 12. As shown in Figure 1, the arm 11 encircles the housing 10 and terminates above the housing in a hand grip portion 13.

A motor 15 is mounted on the housing and a second handle 16 extends rearwardly from the housing. The upper end of the handle 11 is supported above the housing 10 by means of the bracket 17 which encircles the arm 11 adjacent the grip 13. The bracket 17 is affixed to the housing 10 as by fasteners 18.

The housing 10 has an outwardly extending flange 20 which inclines rearwardly and downwardly as shown in Figure 2. Within the flange 20 the housing 10 is formed with a mounting surface 25 best shown in Figure 6. A saw guide blade 26 is affixed to the housing 10 on the surface 25 by means of a pair of fasteners 27 which extend through the housing and through an elongated slot 30 extending lengthwise of the blade. A fastening or cover plate 31 is clamped against the guide blade 25 by means of nuts 32 which are threaded on the fasteners 27.

As will be seen in Figure 2 there is affixed to the output shaft or crankshaft 39 of the motor, a sprocket 40 for driving the cutting chain connecting links 41 and links provided with cutters 42 and links provided with inwardly extending guide members 43.

The guide blade 26 is formed about its perimeter with a groove 45 in which the guides 43 of the chain travel.

The mounting surface 25 is formed with a recess, extending lengthwise of the blade 26 and in which an adjusting screw 51 is positioned. The intermediate portion 52 of this slot is of greater width to slidably receive a nut 53 having an outwardly extending boss 54 positioned in an aperture 55 formed in the guide blade 26. The head 56 of the screw is positioned in a recess 57 whereby the head 56 engages a shoulder 58, see Figure 6, formed on the narrower recess 50 when the screw is tightened to move the nut 53 outwardly or to the left, Figures 2 and 4 to effect outward movement of the blade 26 to reduce the slack in the chain 41.

When the screw 51 is rotated to effect inward movement of the nut 53, the head 56 of the screw engages against shoulders 59 provided at the opposite end of the recess 57 and this end of the recess is formed with an aperture 60 to receive a screwdriver, or wrench, for effecting rotation of the screw 51.

In operation, the nuts 32 are loosened to relieve the clamping pressure on the blade 26 and the screw 51 rotated to effect movement of the blade 26 to provide for the proper slack in the cutting chain 41 whereupon the nuts 32 are tightened to clamp the guide blade in the adjusted position. The blade is preferably formed with a plurality of apertures 55 to provide for greater adjustment of the blade than is effected by the travel of the nuts 53, and these apertures 55 are located in rows on opposite sides of the slot 30 and extending parallel thereto, whereby the blade may be reversed, or turned over, to provide for longer guide life.

Due to the fact that the cutting chain 41 has sliding engagement with the chain guide blade 26, considerable wear on the blade results from this excessive frictional engagement, necessitating the frequent application of a lubricant between the chain and the blade. I have provided a lubricating system particularly convenient to operate and which is effective to discharge oil or lubricant, into the slot or groove 45 in which the tangs 43 of the chain travel. The housing 10 is formed with an oil or lubricant reservoir 60 of substantial dimension. This reservoir is located above the blade 26 when the saw is in normal operation, see Figure 3. One end wall of the reservoir 60 is provided with a removable filler plug 62.

The housing 10 is formed with a vertically disposed passage in which a sleeve 65 is positioned. A bushing 66 is threaded into the upper end of this passage which is formed in an upwardly extending boss 61. This bushing serves as a guide bushing for a rod 67 having a button 68 affixed to its outer end and positioned in proximity to the hand grip 13 on the handle bar 11 whereby the rod 67 may be conveniently depressed by the thumb of the operator without removing his grip from the handle bar. A plunger 70 is affixed to the lower end of the rod 67 and has an intermediate portion 71 of reduced diameter and end portions 72, 73, slidably fitting the sleeve 65. The plunger is yieldingly urged upwardly by a spring 75 mounted below the plunger in the lower portion of the sleeve 65.

The sleeve 65 is formed with apertures 80 and 81 communicating with the oil reservoir 60. The lower end of the sleeve 65 is formed with an aperture 82 arranged in registration with a passage 85 formed in the housing 10. The passage 85 communicates with a groove 90 formed in the mounting surface 25 and a check valve 92 is mounted in the passage 85 and functions to permit passage of oil from the lower portion of the sleeve 65 to the groove 90 when the knob 68 is pressed downwardly.

The chain guide blade 26 is formed with apertures 95 in the side walls of the slots 45 adjacent opposite side edges of the guide blade. These apertures 95 are positioned so that they are in registration with the recess or groove 90, whereby when the knob 68 is depressed oil is discharged from the reservoir 60 to the upper rod of the slot 45. Because of the elongated configuration of the recess 90 the apertures 95 communicate with the recess 90 in all positions in which the blade assumes because of its lengthwise adjustment as previously explained. The fastening plate 31 has a contour complemental to the contour of the mounting surface 25 so that the aperture 95 of each pair in the outer wall of the slot 45 of the guide blade is closed or sealed by the plate 31 to retain the oil in the slot 45 and this is true in respect to all lengthwise adjustments of the blade 26.

It will therefore be seen that by my invention I have provided a portable power chain saw wherein the tension of the saw chain may be quickly and convenionly adjusted to give the optimum operating charcteristics to the saw and further, the friction generated between the saw chain and the guide blade may be kept to a minimum by the selectively operable self-contained lubricating apparatus which is incorporated in the saw.

What I claim is:

1. A chain saw, a frame, a saw chain driving sprocket journalled in the frame, a motor carried by the frame for effecting rotation of said sprocket, said frame having a flat surface in juxtaposition to said sprocket, a saw chain guide blade mounted on said flat surface, means for clamping said blade against said surface and permitting lengthwise adjustment of the blade toward and from said sprocket, said blade being formed in the portion thereof overlying said surface with an aperture, said surface being formed with a recess extending lengthwise of the blade, a screw positioned in said recess and extending lengthwise thereof and being restrained against axial movement, a nut positioned in said recess and having threaded connection with said screw for movement lengthwise of the recess upon rotation of said screw, and said nut having a projection positioned in the aperture of said blade.

2. A chain saw, a frame, a saw chain driving sprocket journalled in the frame, a motor carried by the frame for effecting rotation of said sprocket, said frame having a flat surface in juxtaposition to said sprocket, a saw chain guide blade mounted on said flat surface, means for clamping said blade against said surface and permitting lengthwise adjustment of the blade toward and from said sprocket, said blade being formed in the portion thereof overlying said surface with a series of apertures spaced apart in a direction lengthwise of the blade, said surface being formed with a recess extending lengthwise of the blade, a screw positioned in said recess and extending lengthwise thereof, said screw having an enlarged head portion, said recess being formed with a shoulder spaced from one end wall thereof for engagement by the screw head to limit axial movement of the screw in one direction, a nut positioned in the recess and having a threaded connection with said screw for lengthwise movement thereon upon rotation of said screw, said nut having a projection extending into one of said apertures in said blade.

References Cited in the file of this patent

UNITED STATES PATENTS

| | | |
|---|---|---|
| 2,618,298 | Pratt | Nov. 18, 1952 |
| 2,624,379 | Arneson | Jan. 6, 1953 |
| 2,718,908 | Kiekhaefer | Sept. 27, 1955 |
| 2,748,810 | Strunk | June 5, 1956 |
| 2,765,823 | Kniefl | Oct. 9, 1956 |
| 2,767,746 | Adams | Oct. 23, 1956 |
| 2,839,097 | Siria | June 17, 1958 |